(12) United States Patent
Kirchhoffer

(10) Patent No.: US 10,054,170 B2
(45) Date of Patent: Aug. 21, 2018

(54) CLUTCH MECHANISM FOR MOTOR VEHICLES

(71) Applicant: FORD GLOBAL TECHNOLOGIES, LLC, Dearborn, MI (US)

(72) Inventor: Johann Kirchhoffer, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 433 days.

(21) Appl. No.: 14/885,287

(22) Filed: Oct. 16, 2015

(65) Prior Publication Data

US 2016/0116003 A1 Apr. 28, 2016

(30) Foreign Application Priority Data

Oct. 24, 2014 (DE) ......................... 10 2014 221 702

(51) Int. Cl.
*F16D 13/72* (2006.01)
*F16D 13/70* (2006.01)
*F16D 21/06* (2006.01)

(52) U.S. Cl.
CPC ............. *F16D 13/72* (2013.01); *F16D 13/70* (2013.01); *F16D 21/06* (2013.01); *F16D 2021/0615* (2013.01); *F16D 2021/0684* (2013.01); *F16D 2300/0212* (2013.01)

(58) Field of Classification Search
CPC .......... F16D 13/70; F16D 13/72; F16D 21/06; F16D 2021/0615; F16D 2021/0684; F16D 2300/0212
See application file for complete search history.

(56) References Cited

U.S. PATENT DOCUMENTS

| 6,352,147 | B1 | 3/2002 | Orlamunder et al. |
| 9,631,680 | B2 | 4/2017 | Kirchhoffer |
| 2012/0255826 | A1* | 10/2012 | Tanaka .................. F16D 13/585 192/48.1 |

OTHER PUBLICATIONS

Chinese Office Action dated Jul. 4, 2018 for corresponding Chinese Application No. 201510696109.8, 5 pages.

* cited by examiner

*Primary Examiner* — Huan Le
(74) *Attorney, Agent, or Firm* — James Dottavio; Brooks Kushman P.C.

(57) ABSTRACT

A clutch mechanism for motor vehicles, having a dry individual clutch or a dual clutch, transmits torque from an engine to the transmission or selectively to one of two transmission sections. The clutch has a central disk and, on at least one side, a pressure plate. In order to further improve the cooling effect, especially in the region of the central disk and of the pressure plates, the central disk and/or at least one of the pressure plates is composed of two partial plates, wherein the mutually facing inner surfaces of the partial plates are provided with intermeshing vanes such that the intermeshing vanes of the two partial plates form an interior space having through channels which brings about flow in a radial direction or in a direction having a radial component.

15 Claims, 2 Drawing Sheets

CLUTCH MECHANISM FOR MOTOR VEHICLES

CROSS-REFERENCE TO RELATED APPLICATIONS

This application claims foreign priority benefits under 35 U.S.C. § 119(a)-(d) to DE 10 2014 221 702.4 filed Oct. 24, 2014, which is hereby incorporated by reference in its entirety.

TECHNICAL FIELD

The invention relates to a clutch mechanism for motor vehicles, having a dry individual clutch or a dry dual clutch, which in each case transmits the torque from the engine to the transmission or selectively to one of two transmission sections, and having a cooling system with a fan impeller system for active air cooling of the individual clutch or the dual clutch, wherein the respective clutch has a central disk and, on at least one side, a pressure plate, which can be coupled selectively to the central disk, and wherein the central disk and/or at least one of the pressure plates is provided with passages for the cooling air flow, which extend radially or have a radial component.

BACKGROUND

In addition to the central disk, individual clutches generally have just one single pressure plate, which can be coupled directly or selectively to the central disk, whereas, in the case of dual clutches, there is on each side, in addition to the central disk, a pressure plate, which can be coupled selectively in alternation to the central disk in order to transmit the torque respectively to one of the two transmission sections.

According to an earlier patent application DE 10 2013 209 011.0, which is not a prior publication, the passages are formed by ribs and/or grooves provided in the central disk and/or the pressure plates. In this arrangement, the ribs and grooves are formed on the outsides of the central disk and, if appropriate, the pressure plates. With such a design, very good cooling of the individual components of the clutch is already possible.

SUMMARY

It is the underlying object of the invention to further improve the cooling effect for the individual parts of the clutch, especially the central disk and the pressure plates, and of the overall clutch.

According to the invention, this object is achieved by virtue of the fact that the central disk and/or at least one of the pressure plates is composed of two partial plates, that the mutually facing inner surfaces of the partial plates are provided with intermeshing vanes and that the intermeshing vanes of the two partial plates form an interior space having through channels, which brings about flow of the cooling air in a radial direction or in a direction having a radial component.

The design according to the invention is suitable particularly for the central disk of dual clutches, which are subjected to stress on different sides, depending on the operating state. Owing to the flow channels arranged in the interior space of the clutch disk, intensive cooling is ensured. Although the thermal mass is somewhat reduced owing to the two-part construction and large-volume flow channels, this disadvantage is compensated by the intensive flow of cooling air passing through, wherein the cooling effect far exceeds the effect of a larger thermal mass.

The vanes of the two partial plates are preferably curved, wherein the curvature of the vanes of the two partial plates is oriented in the same circumferential direction and the vanes intermesh with a gap. Curved flow passages are thereby created, ensuring good cooling of the two partial plates.

It is expedient if the intermeshing vanes of the partial plates are curved counter to the direction of rotation of the central disk. This ensures that flow of the cooling air from the inside outward is assisted.

The two partial plates can be connected to one another by means of rivets, which are arranged in a manner distributed at intervals over the circumference of the partial plates.

In this arrangement, the outlets of the through channels provided to guide the cooling air flows, said outlets being situated radially on the outside, are situated in the regions between the riveted joints.

In a preferred embodiment of the invention, the inlets for the cooling air flows are formed on opposite sides in the radially inner region of the partial plates, with the result that the cooling air can penetrate into the respective central disk or pressure plate on both sides and emerge again in the circumferential region.

In order to ensure optimum cooling and good distribution of the cooling air between the partial plates and in order to reduce the heat transfer between the two partial plates, a clearance can be provided between the tips of the vanes and the inner surfaces of the respectively opposite partial plate.

If the central disk is composed of the two partial plates, the design can be configured in such a way that at least one of the two partial plates is supported on one of the output shafts by means of a rolling bearing.

It is expedient here to provide a universal joint (25) between the rolling bearing and the respective partial plate.

The invention is illustrated by way of example in the drawing and is described below in detail by means of the drawing.

DETAILED DESCRIPTION

Figure 1:
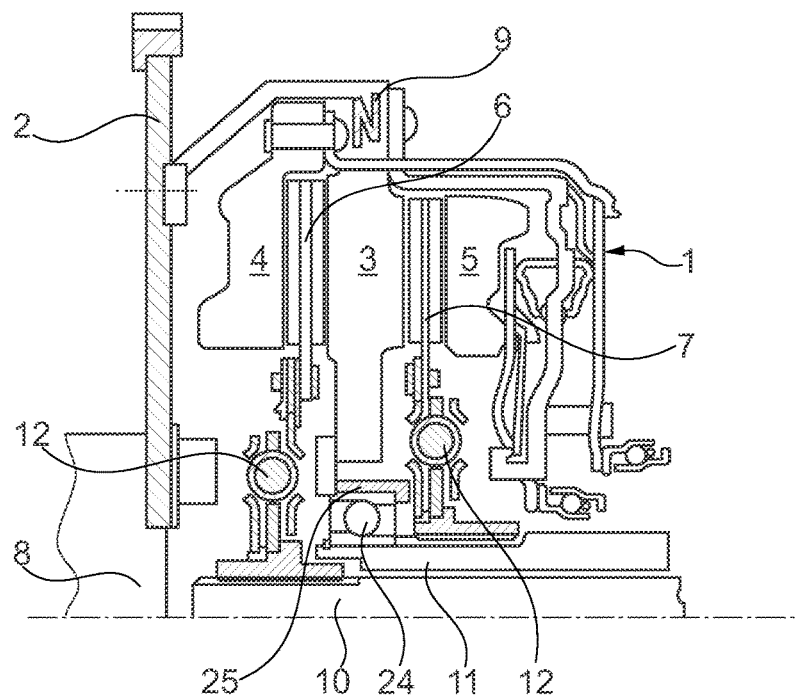
FIG. 1: shows a section through the upper part of a dry dual clutch.

FIG. 1 shows a dual clutch 1, which will be used as an example to explain the invention in detail. The dual clutch 1 belongs to a dual clutch transmission for motor vehicles having two transmission sections (not shown in the drawing). The dual clutch 1 transmits the torque from the engine selectively to one of the two transmission sections. The dual clutch is a dry dual clutch, which is fitted with a cooling system for active air cooling of the dual clutch.

The dual clutch 1 essentially comprises an input disk 2, a central disk 3 connected to the input disk 2, pressure plates 4 and 5 arranged on each side of the central disk 3, and friction disks 6 and 7 arranged between the central disk 3 and the pressure plates 4 and 5 respectively.

The input disk 2 is seated in a fixed manner on the input shaft 8 of the dual clutch 1 and rotates with the input shaft 8 at the same speed of rotation. The input shaft 8 is normally the output shaft or crankshaft of an engine (not shown in the drawing).

The input disk 2 can be connected to the central disk 3 via a spring system 9.

The central disk 3, which can be coupled selectively to either of the two friction disks 6 and 7 by means of the pressure plates 4 and 5, then transmits the torque of the engine either to a solid shaft 10 or to a hollow shaft 11, wherein the two shafts 10 and 11 are each connected to one of the two transmission sections (not shown in the drawing). Damper systems 12 can be provided between the friction disks 6 and 7 and shafts 10 and 11, for example.

Figure 4:
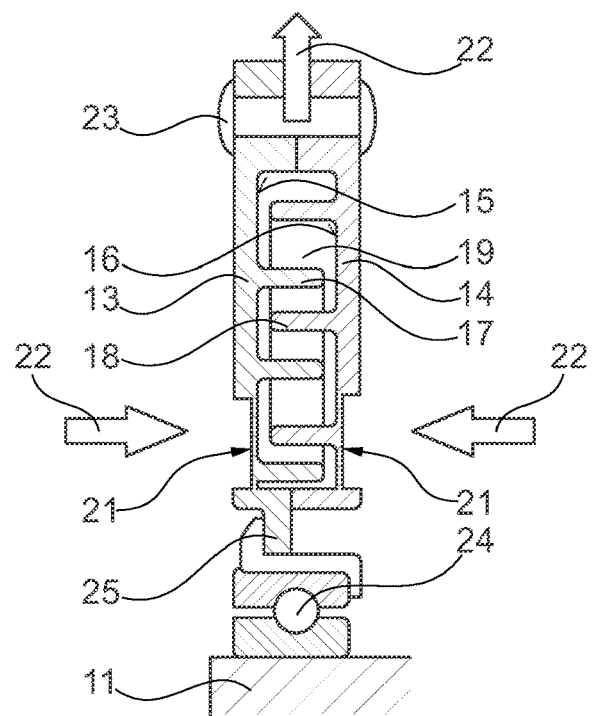
FIG. 4: shows a section through the central disk composed of the two partial plates.

In the illustrative embodiment shown in FIG. 1, the central disk 3 is to be provided with passages for cooling air flows 22 illustrated in FIG. 4.

Figure 2:
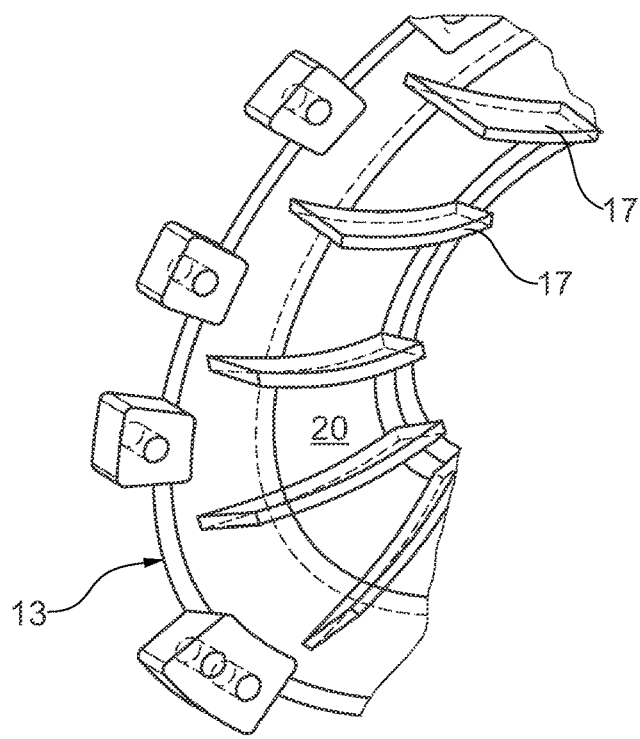
FIG. 2: shows a perspective detail of the left-hand part of the partial plate of a central disk.
Figure 3:
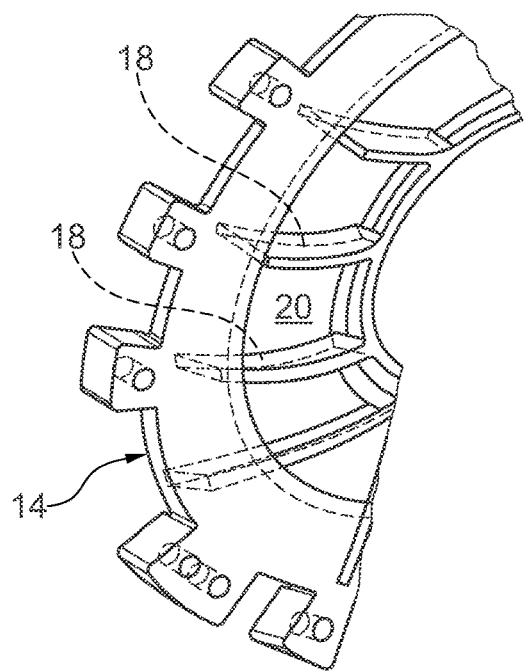
FIG. 3: shows a perspective illustration of a detail of the right-hand part of the partial plate of the central disk.

For this purpose, the central disk 3 is composed of two partial plates 13 and 14 shown in FIGS. 2 and 3.

As is apparent from FIGS. 2 to 4, the mutually facing surfaces 15 and 16 of the partial plates 13 and 14 are provided with intermeshing vanes 17 and 18, wherein the intermeshing vanes 17, 18 of the two partial plates 13, 14 form an interior space 19 having through channels 20 within the central disk 3.

The through passages 20 allow a cooling air flow which has a radial component.

The inlets 21 for the cooling air flows 22 are situated on axially opposite sides in the radially inner region of the partial plates 13 and 14. From there, the cooling air flows 22 pass through the interior space 19 of the central disk 3 composed of the two partial plates 13 and 14 and emerge from the central disk 3 in the radially outer region.

The vanes 17 and 18 of the two partial plates 13 and 14 are of curved design, wherein the curvature of the vanes of the two partial plates 13 and 14 is oriented in the same circumferential direction and the vanes 17 and 18 intermesh with a gap, as is apparent especially from FIG. 4.

The intermeshing vanes 17 and 18 of the partial plates 13 and 14 are curved counter to the direction of rotation of the central disk 3, with the result that the flow of the cooling air from the inside outward is assisted with an accelerating effect.

The two partial plates 13 and 14 are connected to one another by means of rivets 23, wherein the rivets 23 are arranged in a manner distributed at intervals over the circumference of the partial plates 13 and 14.

In this arrangement, the outlets of the through channels 20 formed by the vanes 17 and 18, said outlets being situated radially on the outside, are situated between the riveted joints.

As can be seen especially from FIG. 4, a clearance is provided between the tips of the vanes 17 and 18 and the inner surfaces 15 and 16 of the respectively opposite partial plate 13 or 14, wherein said clearance serves as an additional air passage for the swirling of the cooling air and reduces the heat exchange between the two partial plates.

According to the illustrative embodiment shown in the drawing, the central disk 3 should be composed of the two partial plates 13 and 14. In such a design, at least one of the two partial plates, in the present case partial plate 13, is supported by means of a rolling bearing 24 on the hollow shaft 11, which forms one of the two output shafts from the dual clutch. In this arrangement, partial plate 13 is supported on the rolling bearing 24 by means of a universal joint 25.

The method according to the invention ensures excellent cooling of the central disk, wherein the increased cooling effect compensates the smaller thermal mass provided in the present design.

Dividing the central disk 3 into two partial plates 13 and 14 has a particularly advantageous effect on the service life of the central disk 3 since the thermal stresses on the two sides of the central disk 3, which differ in some cases, are reliably separated from one another without resulting in distortion of the central disk 3.

The heat transfer from one partial plate to the other is prevented by a clearance. This, in turn, also prevents overheating of one partial plate through energy inputs from both sides of said partial plate.

Although only the central disk is to be divided into two partial plates 13 and 14 in the illustrative embodiment under consideration, it is, of course, also possible to configure the pressure plates 4 and 5 in a corresponding way.

What is claimed is:

1. A clutch mechanism for motor vehicles comprising:
   a central disk and pressure plate, wherein at least one of the central disk and pressure plate comprise two partial plates, wherein mutually facing inner surfaces of the partial plates are provided with intermeshing vanes such that the intermeshing vanes define channels on an interior space to bring about flow of cooling air in a direction having a radial component, wherein the vanes of the two partial plates are curved, and wherein a curvature of the vanes is oriented in a same circumferential direction, and wherein the vanes intermesh with a gap.

2. The clutch mechanism of claim 1 wherein the intermeshing vanes of the partial plates are curved counter to a direction of rotation of the central disk.

3. The clutch mechanism of claim 1 wherein the two partial plates are connected to one another by rivets that are arranged in a manner distributed at intervals over a circumference of the partial plates.

4. The clutch mechanism of claim 3 wherein the channels have outlets situated radially on an outside of the channels between the riveted joints.

5. The clutch mechanism of claim 4 wherein the channels have inlets on opposite sides in a radially inner region of the partial plates.

6. The clutch mechanism of claim 1 wherein a clearance is provided between tips of the vanes and the inner surface of the respectively opposite partial plate.

7. The clutch mechanism of claim 1 wherein only the central disk is composed of the two partial plates.

8. The clutch mechanism of claim 7, wherein at least one of the partial plates is supported on a clutch output shaft by a rolling bearing.

9. The clutch mechanism of claim 8 wherein a universal joint is provided between the rolling bearing and the respective partial plate.

10. A clutch mechanism comprising:
    a first partial plate having a first set of vanes; and
    a second partial plate having a second set of vanes intermeshing with the first set of vanes to define cooling air channels having a radial component, wherein the first and second partial plates are connected to one another by rivets distributed at intervals over a circumference of the partial plates.

11. The clutch mechanism of claim 10 wherein the cooling air channels have outlets along the circumference between the riveted joints.

12. The clutch mechanism of claim 11 wherein the cooling air channels have inlets on sides of inner regions of the first and second partial plates.

13. The clutch mechanism of claim 10 wherein a clearance is provided between tips of the first set of vanes and an inner surface of the second partial plate.

14. A clutch comprising:
   a central disk having first and second partial plates, mutually facing inner surfaces of which are provided with intermeshing vanes that define cooling air channels on an interior space of the central plate; and
   a rolling bearing supporting the first partial plate on a clutch output shaft.

15. The clutch of claim 14 further comprising a universal joint between the rolling bearing and the first partial plate.

* * * * *